United States Patent
Kuramochi et al.

(10) Patent No.: US 11,624,016 B2
(45) Date of Patent: Apr. 11, 2023

(54) MOISTURE-CURABLE REACTIVE HOT-MELT ADHESIVE COMPOSITION AND METHOD FOR PRODUCING THE SAME

(71) Applicant: HITACHI CHEMICAL COMPANY, LTD., Tokyo (JP)

(72) Inventors: Chika Kuramochi, Tokyo (JP); Souichirou Komiya, Tokyo (JP); Kazuyuki Magome, Tokyo (JP); Kohji Suzumura, Tokyo (JP)

(73) Assignee: SHOWA DENKO MATERIALS CO., LTD., Tokyo (JP)

(*) Notice: Subject to any disclaimer, the term of this patent is extended or adjusted under 35 U.S.C. 154(b) by 0 days.

(21) Appl. No.: 16/096,335

(22) PCT Filed: Apr. 11, 2017

(86) PCT No.: PCT/JP2017/014845
§ 371 (c)(1),
(2) Date: Oct. 25, 2018

(87) PCT Pub. No.: WO2017/187968
PCT Pub. Date: Nov. 2, 2017

(65) Prior Publication Data
US 2019/0127618 A1    May 2, 2019

(30) Foreign Application Priority Data
Apr. 26, 2016   (JP) .............................. JP2016-088059

(51) Int. Cl.
| | |
|---|---|
| *C09J 175/16* | (2006.01) |
| *C09J 175/04* | (2006.01) |
| *C08G 18/40* | (2006.01) |
| *C08G 18/69* | (2006.01) |
| *C08G 18/76* | (2006.01) |
| *C08G 18/10* | (2006.01) |
| *C08G 18/30* | (2006.01) |
| *C09J 11/00* | (2006.01) |
| *C09J 11/06* | (2006.01) |
| *C08G 18/12* | (2006.01) |
| *C08G 18/42* | (2006.01) |
| *C08G 18/48* | (2006.01) |
| *C08G 18/62* | (2006.01) |
| *C08K 5/13* | (2006.01) |
| *C09J 5/06* | (2006.01) |

(52) U.S. Cl.
CPC ............ *C09J 175/16* (2013.01); *C08G 18/10* (2013.01); *C08G 18/12* (2013.01); *C08G 18/30* (2013.01); *C08G 18/40* (2013.01); *C08G 18/4018* (2013.01); *C08G 18/4063* (2013.01); *C08G 18/4202* (2013.01); *C08G 18/4211* (2013.01); *C08G 18/4238* (2013.01); *C08G 18/4825* (2013.01); *C08G 18/6208* (2013.01); *C08G 18/69* (2013.01); *C08G 18/698* (2013.01); *C08G 18/7614* (2013.01); *C08G 18/7621* (2013.01); *C08G 18/7642* (2013.01); *C08G 18/7671* (2013.01); *C08K 5/13* (2013.01); *C09J 5/06* (2013.01); *C09J 11/00* (2013.01); *C09J 11/06* (2013.01); *C09J 175/04* (2013.01); *C08G 2170/20* (2013.01); *C09J 2301/304* (2020.08); *C09J 2475/00* (2013.01)

(58) Field of Classification Search
CPC .. C08G 18/4018; C08G 18/69; C08G 18/698; C08G 18/7614; C08G 18/7621; C08G 18/7642; C08G 18/10; C08G 18/30; C08G 18/40; C08G 18/12; C08G 18/4063; C08G 18/4202; C08G 18/4211; C08G 18/4238; C08G 18/4825; C08G 18/6208; C08G 18/7671; C08G 2170/20; C08K 5/13; C09J 175/16; C09J 175/04; C09J 11/00; C09J 11/06; C09J 5/06; C09J 2301/304; C09J 2475/00
See application file for complete search history.

(56) References Cited

U.S. PATENT DOCUMENTS

| | | | |
|---|---|---|---|
| 2006/0247376 A1* | 11/2006 | Hasegawa | .............. C08G 18/62 525/123 |
| 2014/0242396 A1* | 8/2014 | Kanagawa | ......... C08G 18/4202 428/423.1 |

FOREIGN PATENT DOCUMENTS

| | | |
|---|---|---|
| CN | 103890032 A | 6/2014 |
| JP | S52-037936 A | 3/1977 |
| JP | S64-054089 A | 3/1989 |
| JP | H6-122860 A | 5/1994 |
| JP | 2002265917 A | 9/2002 |
| JP | 2005314640 A | 11/2005 |
| JP | 2009-286883 A | 12/2009 |
| JP | 2012-067315 A | 4/2012 |
| JP | 2013-163707 A | 8/2013 |
| JP | 2014-205764 A | 10/2014 |

OTHER PUBLICATIONS https://mcl.mse.utah.edu/determination-of-crystallinity-in-polymers/ (Year: 2021).*
http://www.tainstruments.com/pdf/literature/TA123new.pdf (Year: 2010).*

* cited by examiner

*Primary Examiner* — Patrick D Niland
(74) *Attorney, Agent, or Firm* — Fitch, Even, Tabin & Flannery, LLP

(57) ABSTRACT

A moisture-curable reactive hot-melt adhesive composition comprises: a urethane prepolymer having an isocyanate group, the urethane prepolymer being a reaction product of a polyol component comprising a polyester polyol, a polyether polyol and a polybutadiene polyol with an isocyanate component; and an antioxidant.

19 Claims, No Drawings

MOISTURE-CURABLE REACTIVE HOT-MELT ADHESIVE COMPOSITION AND METHOD FOR PRODUCING THE SAME

CROSS-REFERENCE TO RELATED APPLICATIONS

This application is a U.S. national phase application filed under 35 U.S.C. § 371 of International Application No. PCT/JP2017/014845, filed Apr. 11, 2017, designating the United States, which claims priority from Japanese Patent Application No. 2016-088059, filed Apr. 26, 2016, which are hereby incorporated herein by reference in their entirety.

TECHNICAL FIELD

The present invention relates to a moisture-curable reactive hot-melt adhesive composition and a method for producing the same.

BACKGROUND ART

As hot-melt adhesives do not impose a heavy burden on the environment and human body due to them being solvent-free adhesives, they are suitable for improving productivity through their faster adhering time. Hot-melt adhesives can be roughly classified into two categories, which are those containing a thermoplastic resin as the main component and those containing a reactive resin as the main component. As the reactive resin, urethane prepolymers having isocyanate groups at the ends are mainly used. After application, the reactive hot melt adhesives containing urethane prepolymers as the main component exhibit some degree of adhesive strength in a short time due to the cooling solidification of the adhesives themselves. Then, the end isocyanate groups of the urethane prepolymers react with moisture in the air or moisture on the surface of adherends, so that the molecular weight increases and cross-linking occurs to thereby form an adhesive layer which exhibits heat resistance. Thus, the reactive hot-melt adhesives containing urethane prepolymers as the main components exhibit good adhesive strength even when heated. Reactive hot-melt adhesive compositions that have improved initial adhesive strength and contain polyurethane prepolymers, thermoplastic resins, and tackifiers are also known (for example, refer to Patent Literatures 1 to 3).

Conventionally, double-sided tapes were often used for adhering together parts such as of display sections in wearable terminals such as cellular phones. Since wearable terminals are carried around, they may be accidentally dropped when being carried or when in use. Therefore, impact resistance is required for the adhered portions of the wearable terminals so that parts bonded together do not come apart due to impact when dropped. A double-sided pressure-sensitive adhesive tape that has excellent impact resistance is described, for example, in Patent Literature 4.

CITATION LIST

Patent Literature

Patent Literature 1: JP H06-122860 A
Patent Literature 2: JP S64-054089 A
Patent Literature 3: JP S52-037936 A
Patent Literature 4: JP 2012-67315 A

SUMMARY OF INVENTION

Technical Problem

In recent years, the areas of adhesion between parts have become smaller with the downsizing of wearable terminals, and parts of complicated shapes have increased in number. Therefore, conventional adhesion methods using double-sided tapes may not be able to provide sufficient adhesiveness or may lack in long-term adhesion stability (reliability) and adhesives that have excellent adhesiveness, excellent impact resistance and high reliability and that can be an alternative to double-sided tapes are required. Additionally, it is more difficult to process tapes when adhesion width (for example, 0.7 mm or less) is narrow.

An object of the present invention is to provide a moisture-curable reactive hot-melt adhesive composition having excellent applicability that enable adhering together parts over an extremely small area while having excellent adhesiveness, excellent impact resistance and high reliability; and a method for producing the same.

Solution to Problem

The present invention provides a moisture-curable reactive hot-melt adhesive composition comprising: a urethane prepolymer having an isocyanate group, the urethane prepolymer being a reaction product of a polyol component comprising a polyester polyol, a polyether polyol and a polybutadiene polyol with an isocyanate component; and an antioxidant.

The polybutadiene polyol may contain 20% or more of a structural unit having a 1,2-vinyl bond and represented by the following formula (1). The amount of the polybutadiene polyol blended may be 5 to 45 parts by mass based on a total amount of the above-mentioned polyol component of 100 parts by mass.

[Chemical Formula 1]

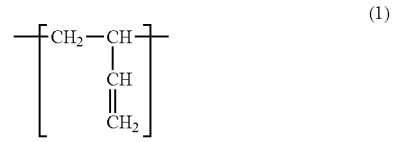

In the above-mentioned moisture-curable reactive hot-melt adhesive composition, a content of the antioxidant may be 0.08 to 5 parts by mass per 100 parts by mass of the urethane prepolymer having an isocyanate group, The present invention also provides a method for producing a moisture-curable reactive hot-melt adhesive composition comprising a urethane prepolymer having an isocyanate group and an antioxidant, the method comprising a step of reacting a polyol component comprising a polyester polyol, a polyether polyol and a polybutadiene polyol with an isocyanate component to obtain the urethane prepolymer having an isocyanate group.

Advantageous Effects of Invention

According to the present invention, a moisture-curable reactive hot-melt adhesive composition having excellent applicability that enable adhering together parts over an extremely small area while having excellent adhesiveness, excellent impact resistance and high reliability, and a method for producing the same can be provided.

DESCRIPTION OF EMBODIMENTS

Preferred embodiments of the present invention will be described in detail hereinafter. However, the present invention is not limited to the following embodiments.

<Definition>

A numerical value range indicated using "to" indicates a range including the numerical values described above and below "to" as the minimum and the maximum herein, respectively. In numerical value ranges gradually described herein, the upper limit value or the lower limit value of a numerical value range at a certain level may be replaced with the upper limit value or the lower limit value of a numerical value range at another level. The upper limit values or the lower limit values of numerical value ranges in the numerical value ranges described herein may be replaced with values shown in Examples. "A or B" means that either A or B may be included and both may be included. Materials illustrated herein can be used alone or in combination of two or more unless otherwise specified. When a plurality of substances corresponding to each component exist in a composition, the content of each component in a composition means the total amount of the plurality of substances existing in the composition herein unless otherwise specified.

"Open time" means time for which pasting can be performed after the application of an adhesive composition herein. "Initial adhesiveness" means adhesive strength 1 hour after an adhesive composition is melted and applied to adherends, followed by adhesion, and "adhesiveness" means adhesive strength 7 days after.

<Moisture-Curable Reactive Hot-Melt Adhesive Composition>

A moisture-curable reactive hot-melt adhesive composition (sometimes abbreviated as an "adhesive composition" hereinafter.) of the present embodiment is characterized by comprising: a urethane prepolymer having an isocyanate group, the urethane prepolymer being a reaction product of a polyol component comprising a polyester polyol, a polyether polyol and a polybutadiene polyol with an isocyanate component; and an antioxidant. A moisture-curable reactive hot-melt adhesive composition generally increases to a high molecular weight, and exhibits adhesiveness and the like by reacting with moisture in the air or moisture on the surface of adherends.

The adhesive composition according to the present embodiment has excellent applicability enabling adhering parts in extremely small portions due to having good viscosity. The cured product of the adhesive composition has excellent adhesiveness to adherends, excellent impact resistance and high reliability. The adhesive composition according to the present embodiment imposes a light burden to the environment and the human body, and enables adhering for a short period of time due to being solvent-free adhesives. The adhesive composition according to the present embodiment is easily handled due to being a one-component adhesive.

(Urethane Prepolymer Having an Isocyanate Group)

The urethane prepolymer having an isocyanate group concerning the present embodiment (it may be hereinafter called a "reactive urethane prepolymer".) is formed by reacting a polyol component essentially containing a polyester polyol, a polyether polyol and a polybutadiene polyol with an isocyanate component, and has isocyanate groups at the ends of a urethane prepolymer. Therefore, excellent adhesiveness and excellent impact resistance can be exhibited after moisture-curing.

The reactive urethane prepolymer has a structural unit derived from the polyol component containing a polyester polyol, a polyether polyol and a polybutadiene polyol, and a structural unit derived from the isocyanate component.

Having a structural unit derived from a polyester polyol enables adjusting solidification time and viscosity. As the polyester polyol, a compound generated by the polycondensation reaction of a polyhydric alcohol and a polycarboxylic acid can be used. The polyester polyol may be, for example, a polycondensate of a polyhydric alcohol having 2 to 15 carbon atoms and 2 or 3 hydroxyl groups, and a polycarboxylic acid having 2 to 14 carbon atoms (including carbon atoms in carboxyl groups) and having 2 to 6 carboxyl groups.

The polyester polyol may be a linear polyester diol generated from a diol and a dicarboxylic acid, or may be a branched polyester triol generated from a triol and a dicarboxylic acid. The branched polyester triol can also be obtained by the reaction of a diol and a tricarboxylic acid.

Examples of the polyhydric alcohol include aliphatic or alicyclic diols such as ethylene glycol, 1,2-propanediol, 1,3-propanediol, isomers of butanediol, isomers of pentanediol, isomers of hexanediol, 2,2-dimethyl-1,3-propanediol, 2-methylpropanediol, 2,4,4-trimethyl-1,6-hexanediol, 2,2,4-trimethyl-1,6-hexanediol, 1,4-cyclohexanediol and 1,4-cyclohexanedimethanol; aromatic diol such as 4,4'-dihydroxydiphenyl propane, bisphenol A, bisphenol F, pyrocatechol, resorcinol and hydroquinone. The polyhydric alcohol may be used alone or in combination of two or more. Among these, aliphatic diols are preferable, and aliphatic diols having 2 to 6 carbon atoms are more preferable.

Examples of the polycarboxylic acid include aromatic polycarboxylic acids such as phthalic acid, isophthalic acid, terephthalic acid, 1,2,4-benzene tricarboxylic acid; aliphatic or alicyclic polycarboxylic acids such as maleic acid, fumaric acid, aconitic acid, 1,2,3-propanetricarboxylic acid, nialonic acid, succinic acid, glutaric acid, adipic acid, pimelic acid, azelaic acid, sebacic acid, cyclohexane-1,2-dicarboxylic acid and 1,4-cyclohexadiene-1,2-dicarboxylic acid. The polycarboxylic acid may be used alone or in combination of two or more.

Polycarboxylic acid derivatives such as carboxylic anhydrides and compounds in which a part of carboxyl groups is esterified can also be used instead of the above-mentioned polycarboxylic acids. Examples of the polycarboxylic acid derivatives include dodecyl maleic acid and octadecenyl maleic acid.

Examples of the polyester polyol include crystalline polyester polyols and amorphous polyester polyols. It is determined based on its state at 25° C. whether it is crystalline or amorphous. Herein, a polyester polyol that is crystalline at 25° C. is defined as a crystalline polyester polyol, and a polyester polyol that is noncrystalline at 25° C. is defined as an amorphous polyester polyol. It is preferable that the polyester polyol contain a crystalline polyester polyol and an amorphous polyester polyol from the viewpoints of applicability and the initial adhesiveness of the adhesive composition.

It is preferable that the number average molecular weight (Mn) of the crystalline polyester polyol be in the range of 500 to 10000, it is more preferable that it be in the range of 800 to 9000, and it is still more preferable that it be in the range of 1000 to 8000 from the viewpoints of waterproofness and adhesiveness. The number average molecular weight is a value that is measured by gel permeation chromatography (GPC) and into which the conversion is performed in terms of standard polystyrene herein. Measurement of GPC can be performed under the following conditions.

Column: "Gelpack GLA130-S", "Gelpack GLA150-S" and "Gelpack GLA160-S" (manufactured by Hitachi Chemical Company, Ltd., packed columns for HPLC)
Eluate: Tetrahydrofuran
Flow rate: 1.0 mL/min
Column temperature: 40° C.
Detector: RI Examples of the amorphous polyester polyol include amorphous polyester polyols having a molecular weight of 3000 or less and amorphous polyester polyols having a molecular weight of 5000 or more. It is preferable that the number average molecular weight of the amorphous polyester polyol having a molecular weight of 3000 or less be in the range of 500 to 3000, and it is more preferable that it be in the range of 1000 to 3000 from the viewpoint of further improving the adhesiveness of the adhesive composition. It is preferable that the number average molecular weight of the amorphous polyester polyol having a molecular weight of 5000 or more be in the range of 5000 to 9000, and it is more preferable that it be in the range of 7000 to 8000 from the viewpoint of further improving the impact resistance.

The polyester polyol may be used alone or in combination of two or more. It is preferable that the content of the polyester polyol be 40 to 70 parts by mass, and it is more preferable that it be 45 to 65 parts by mass based on a total amount of the polyol of 100 parts by mass from the viewpoint of further improving adhesiveness.

The inclusion of a structural unit derived from a polyether polyol enables adjusting moderate melt viscosity and open time after the application of the adhesive composition and imparting excellent workability, adhesiveness, waterproofness and flexibility. Examples of the polyether polyol include polyethylene glycol, polypropylene glycol, polybutylene glycol, polytetramethylene glycol and ethylene oxide-modified polypropylene glycol.

It is preferable that the number average molecular weight of the polyether polyol be in the range of 500 to 5000, it is more preferable that it be in the range of 700 to 4500, and it is still more preferable that it be in the range of 1000 to 4000 from the viewpoints of the initial adhesiveness, adhesiveness and moderate open time after application. The polyether polyol may be used alone or in combination of two or more.

It is preferable that the content of the polyether polyol be 10 to 30 parts by mass, and it is more preferable that it be 15 to 25 parts by mass based on a total amount of the polyol component of 100 parts by mass from the viewpoint of ease of adjusting to low viscosity and the viewpoint of adhesion to substrates.

The inclusion of a structural unit derived from a polybutadiene polyol enables improving impact resistance and adhesiveness after the moisture-curing of the adhesive composition. The polybutadiene polyol may be a liquid butadiene copolymer having hydroxyl groups at the molecular ends. It is preferable that the number average molecular weight of the polybutadiene polyol be 1000 to 5000, it is more preferable that it be 1000 to 4000, and it is still more preferable that it be 1200 to 3000. Impact resistance is further improved easily when the number average molecular weight of the polybutadiene polyol is 1000 or more, and adhesiveness hardly decreases when it is 5000 or less.

It is preferable that the content of polybutadiene polyol be 5 to 45 parts by mass, it is more preferable that it be 5 to 40 parts by mass, and it is still more preferable that it be 10 to 35 parts by mass based on a total amount of the polyol component of 100 parts by mass. Impact resistance is further improved easily after the moisture-curing of the adhesive composition when the content of the polybutadiene polyol is 5 parts by mass or more, and the viscosity at the time of the melting of the adhesive composition by heating does not become too high and it tends to be excellent in application workability when it is 45 parts by mass or less.

The polybutadiene polyol has a structural unit (I) having a 1,2-vinyl bond represented by the following formula (1) (sometimes abbreviated as a "structural unit (I)" hereafter) as a structure based on butadiene. It is preferable that the polybutadiene polyol have 20% or more of the structural unit (I), it is more preferable that it have 50% or more of the structural unit (I), and it is still more preferable that it have 85% or more of the structural unit (I) 85% or more from the viewpoint of further improving impact resistance. The upper limit value of the rate of the structural unit (I) may be, for example, 100% or less.

[Chemical Formula 2]

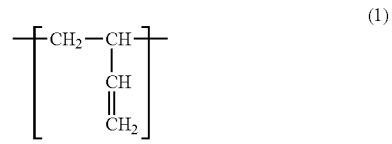

(1)

Examples of commercial polybutadiene polyols include the trade name "G-1000" produced by Nippon Soda Co., Ltd. (the number of hydroxyl groups: 2, number average molecular weight: 1400, the rate for which the structural unit (I) account: 85%) and the trade name "R-45HT" produced by Idemitsu Kosan Co., Ltd. (the number of hydroxyl groups: 2, number average molecular weight: 2800, the rate for which the structural unit (I) account: 20%). The polybutadiene polyol may be used alone or in combination of two or more.

The polyol component may contain a polyol besides the polyester polyol, the polyether polyol and the polybutadiene polyol.

Examples of the isocyanate component include aromatic isocyanates such as diphenylmethane diisocyanate, dimethyldiphenylmethane diisocyanate, tolylene diisocyanate, xylylene diisocyanate and p-phenylene diisocyanate; alicyclic isocyanates such as dicyclohexylmethane diisocyanate and isophorone diisocyanate; and aliphatic isocyanates such as hexamethylene diisocyanate. It is preferable that the isocyanate component contain an aromatic diisocyanate, and it is more preferable than it contain diphenylmethane diisocyanate from the viewpoint of reactiveness and adhesiveness. The isocyanate component may be used alone or in combination of two or more.

The method for producing a reactive urethane prepolymer is not particularly limited. The reactive urethane prepolymer may be produced, for example, by mixing isocyanate with polyols or mixing a mixture of a polyester polyol and an isocyanate, a mixture of a polyether polyol and an isocyanate, and a mixture of a polybutadiene polyol and an isocyanate.

When the reactive urethane prepolymer is synthesized, it is preferable that NCO/OH, which is the ratios of an equivalent to isocyanate groups (NCO) in the isocyanate component/an equivalent to hydroxyl groups (OH) in the polyol component, be 1.5 to 3.0, and it is more preferable that it he 1.8 to 2.5 as to the mixing ratio of the isocyanate component to the polyol component. When the ratio of NCO/OH is 1.5 or more, an increase in the viscosity of the obtained reactive urethane prepolymer is suppressed, and workability is improved easily. When the ratio of NCO/OH is 3.0 or less, foam is hardly formed, and a decrease in adhesiveness tends to be suppressed at the time of the moisture-curing reaction of the adhesive composition.

(Antioxidant)

The adhesive composition according to the present embodiment has excellent adhesiveness and excellent impact resistance after moisture-curing, and has high reliability by containing the above-mentioned reactive urethane prepolymer and an antioxidant in combination.

Examples of the antioxidant include phenolic, organic sulfur, hindered phenolic, hindered amine and organophosphorus antioxidants. Specific examples of the hindered phenolic antioxidants include pentaerythritol tetrakis[3-(3, 5-di-tert-butyl-4-hydroxyphenyl) propionate] (produced by SONGWON INTERNATIONAL-JAPAN K.K., trade name "SONGNOX1010") and n-octadecyl-3-(3,5-di-tert-butyl-4-hydroxyphenyl)propionate (produced by SONGWON INTERNATIONAL-JAPAN K.K., trade name "SONGNOX1076"), and specific examples of the organophosphorus antioxidant include tris(2,4-di-tert-butylphenyl)phosphite (produced by SONGWON INTERNATIONAL-JAPAN K.K., trade name "SONGNOX1680"). It is preferable to use especially a hindered phenolic antioxidant from the viewpoint that high reliability can be obtained.

It is preferable that the content of the antioxidant in the adhesive composition be 0.05 to 5 parts by mass, it is more preferable that it be 0.08 to 4.5 parts by mass, and it is still more preferable that it be 0.1. to 4 parts by mass per 100 parts by mass of the reactive urethane prepolymer. The adhesive composition has high reliability after the moisture-curing of the adhesive composition when the content of the antioxidant is 0.05 or more parts by mass, and the adhesive composition tends to be excellent in storage stability when the content of the antioxidant is 5 or less parts by mass. The content of the reactive urethane prepolymer in the adhesive composition corresponds to the total amount of the isocyanate component and the polyol component.

(Other Components)

A thermoplastic polymer, a tackifying resin, a catalyst, a pigment, an ultraviolet absorber, a surfactant, a flame retardant, a filler and the like may be blended in the adhesive composition according to the present embodiment in proper amounts if needed.

Examples of the thermoplastic polymer include polyurethanes, ethylene copolymers, propylene copolymers, vinyl chloride copolymers, acrylic copolymers and styrene-conjugated diene block copolymers. Examples of the tackifying resin include rosin resins, rosin ester resins, hydrogenated rosin ester resins, terpene resins, terpene phenol resins, hydrogenated terpene resins, petroleum resins, hydrogenated petroleum resins, coumarone resins, ketone resins, styrene resins, modified styrene resins, xylene resins and epoxy resins. Examples of the catalyst include dibutyltin dilaurate, dibutyltin octoate, dimethylcyclohexylamine, dimethylbenzylamine and trioctylamine.

It is preferable that the open time of the adhesive composition according to the present embodiment be 30 to 300 seconds, it is more preferable that it be 45 to 280 seconds, and it is still more preferable that it be 60 to 240 seconds. A long period of time can be spent on time for which pasting is possible when the open time is 30 seconds or more, and adhesive strength is easily exhibited immediately after adhesion when it is 300 seconds or less.

The applicability of an adhesive composition can be evaluated by measuring the viscosity of an adhesive composition. It is preferable that the viscosity of the adhesive composition according to the present embodiment measured using a rotational viscometer be 10 Pa·s or less at 120° C., it is more preferable that it be 8 Pa·s or less, and it is still more preferable that it be 6 Pa·s or less from the viewpoint of having excellent applicability to adherends. Although the lower limit value of viscosity is not limited, it may be, for example, 2 Pa·s or more at 120° C.

The adhesiveness of an adhesive composition can be evaluated by measuring the adhesive strength 7 days after adherends are adhered at 23° C. using an adhesive composition. It is preferable that the adhesive strength 7 days after be 100 N/25 mm or more, it is more preferable that it be 110 N/25 mm or more, and it is still more preferable that it be 120 N/25 mm or more from the viewpoint of having excellent adhesiveness. Although the upper limit value of the adhesive strength is not particularly limited, it may be, for example, 500 N/25 mm or less.

The reliability of an adhesive composition can be evaluated by measuring the adhesive strength after adherends are adhered using the adhesive composition and kept under high temperature and high humidity conditions. It is preferable that adhesive strength 7 days after adherends are adhered using the adhesive composition according to the present embodiment and left to stand under the high temperature and high humidity conditions of a temperature of 85° C. and a humidity of 85% be 100 N/25 mm or more, it is more preferable that it be more than 110 N/25 mm, and it is still more preferable that it be 115 N/25 mm from the viewpoint of having excellent adhesiveness. Although the upper limit value of adhesive strength 7 days after they are left to stand is not particularly limited, it may be, for example, 500 N/25 mm or less.

The impact resistance of an adhesive composition can be evaluated also by dropping a weight on a laminated body obtained by adhering adherends using the adhesive composition and visually confirming whether peeling occurs. It is preferable that peeling do not occur when a weight having a load of 300 g is dropped from a height of 250 mm to a laminated body by a method described in the below-mentioned Examples from the viewpoint of having excellent impact resistance.

<Method for Producing Moisture-Curable Reactive Hot-Melt Adhesive Composition>

The adhesive composition according to the present embodiment is produced by a method comprising a step of reacting a polyol component comprising a polyester polyol, a polyether polyol and a polybutadiene polyol with an isocyanate component to obtain a urethane prepolymer having an isocyanate group.

The adhesive composition according to the present embodiment may be produced, for example, by a method for reacting a polyol component and an isocyanate component in the presence of an antioxidant to obtain a urethane prepolymer having an isocyanate group or by a method for reacting a polyol component and an isocyanate component beforehand to obtain a urethane prepolymer having an isocyanate group and then mixing an antioxidant therein.

It is preferable that the amount of the antioxidant blended be 0.05 to 5 parts by mass, it is more preferable that it be 0.08 to 5 parts by mass, it is still more preferable that it be 0.08 to 4.5 parts by mass, and it is particularly preferable that it be 0.1 to 4 parts by mass based on a total amount of the polyol of 100 parts by mass from the viewpoint of the reliability of the adhesive composition.

The moisture-curable reactive hot-melt adhesive composition of the present embodiment has excellent applicability enabling adhering adherends by applying it to the surfaces of the adherends and especially enabling adhering parts in extremely small portions, and has excellent adhesiveness, the excellent impact resistance and high reliability. The adhesive composition according to the present embodiment can be suitably applied to the case where it is required imparting impact resistance using a small amount.

EXAMPLES

Although the present invention will be described by Examples more specifically hereinafter, the present invention is not limited to these Examples. Unless otherwise specified, parts are parts by mass.

(Polyol Component)

As polyester polyols, a polyester polyol a (a crystalline polyester polyol obtained by using adipic acid and 1,6-hexanediol as the main components, the number of hydroxyl groups: 2, the number average molecular weight: 5000), a polyester polyol b (a crystalline polyester polyol obtained by using adipic acid and ethylene glycol as the main components, the number of hydroxyl groups: 2, the number average molecular weight: 2000), a polyester polyol c (an amorphous polyester polyol obtained by using isophthalic acid and neopentyl glycol as the main components, the number of hydroxyl groups: 2, the number average molecular weight: 2000), and a polyester polyol d (an amorphous polyester polyol obtained by using azelaic acid and ethylene glycol as the main components, the number of hydroxyl groups: 2, the number average molecular weight: 8000) were provided. As a polyether polyol, polypropylene glycol (the number of hydroxyl groups: 2, number average molecular weight: 2000) was provided. As polybutadiene polyols, a polybutadiene polyol a (the number of hydroxyl groups: 2, the number average molecular weight: 1400, the rate for which the structural unit (I) account: 85%, produced by Nippon Soda Co., Ltd., the trade name "G-1000") and a polybutadiene polyol b (the number of hydroxyl groups: 2, the number average molecular weight: 2800, the rate for which the structural unit (I) account: 20%, produced by Idemitsu Kosan Co., Ltd., the trade name "R-45HT") were provided.

(Isocyanate Component)

As an isocyanate component, diphenylmethane diisocyanate (the number of isocyanate groups: 2) was provided.

(Antioxidant)

As an antioxidant, the trade name "SONGNOX1076" produced by SONGWON INTERNATIONAL-JAPAN K.K., which is a hindered phenolic antioxidant, was prepared.

Example 1

First, 10 parts of the polyester polyol a, 45 parts of the polyester polyol b, 8 parts of the polyester polyol c, 3 parts of the polyester polyol d, 24 parts of polypropylene glycol, and 10 parts of the polybutadiene polyol a which were subjected to dehydrating treatment in a vacuum dryer beforehand were added to 0.2 parts of the antioxidant, followed by mixing homogeneously, and then 24 parts of diphenyhnethane diisocyanate was further added thereto, followed by mixing homogeneously. Subsequently, the obtained mixture was reacted at 110° C. for 1 hour and further subjected to vacuum degassing stirring at 110° C. for 1 hour to obtain an adhesive composition containing a urethane prepolymer having an isocyanate group.

Example 2

An adhesive composition was obtained in the same way as in Example 1 except that 10 parts of the polyester polyol a, 40 parts of the polyester polyol b, 7 parts of the polyester polyol c, 3 parts of the polyester polyol d, 20 parts of polypropylene glycol, and 20 parts of the polybutadiene polyol b were used as a polyol component and the amount of diphenylmethane diisocyanate blended was changed into 22 parts.

Example 3

An adhesive composition was obtained in the same way as in Example 1 except that 8 parts of the polyester polyol a, 33 parts of the polyester polyol b, 6 parts of the polyester polyol c, 2 parts of the polyester polyol d, 16 parts of polypropylene glycol, and 35 parts of the polybutadiene polyol a were used as a polyol component and the amount of diphenylmethane diisocyanate blended was changed into 27 parts.

Example 4

An adhesive composition was obtained in the same way as in Example 1 except that 10 parts of the polyester polyol a, 40 parts of the polyester polyol b, 7 parts of the polyester polyol c, 3 parts of the polyester polyol d, 20 parts of polypropylene glycol, and 20 parts of the polybutadiene polyol a were used as a polyol component and the amount of the antioxidant blended was changed into 0.1 parts.

Example 5

An adhesive composition was obtained in the same way as in Example 4 except that the amount of the antioxidant blended was changed into 3 parts.

Example 6

An adhesive composition was obtained in the same way as in Example 4 except that the amount of the antioxidant blended was changed into 5 parts.

Comparative Example 1

An adhesive composition was obtained in the same way as in Example 1 except that 13 parts of the polyester polyol a, 50 parts of the polyester polyol b, 9 parts of the polyester polyol c, 3 parts of the polyester polyol d, and 25 parts of polypropylene glycol were used as a polyol component and the amount of diphenylmethane diisocyanate blended was changed into 22 parts.

Comparative Example 2

An adhesive composition was obtained in the same way as in Example 4 except that the antioxidant was not blended.

Comparative Example 3

An adhesive composition was obtained in the same way as in Example 1 except that 70 parts of polypropylene glycol and 30 parts of polybutadiene polyol a were used as a polyol component and the amount of diphenylmethane diisocyanate blended was changed into 28 parts.

Comparative Example 4

An adhesive composition was obtained in the same way as in Example 1 except that 13 parts of the polyester polyol a, 50 parts of the polyester polyol h, 9 parts of the polyester polyol c, 3 parts of the polyester polyol d, and 25 parts of the polybutadiene polyol b were used as a polyol component and the amount of diphenylmethane diisocyanate blended was changed into 21 parts.

Characteristics of the adhesive compositions obtained by Examples 1 to 6 and Comparative Examples 1 to 4 were evaluated as follows. The results are shown in Table 1 and 2.

<Viscosity>

The melt viscosity of the adhesive compositions was measured under the following conditions using a BH-HH type rotational viscometer for small amounts (manufactured by TOKI SANGYO CO., LTD.).
Rotor: No. 4 rotor
Amount of sample: 15 g
Number of rotations of rotor: 50 rpm
Temperature: 120° C.

<Adhesiveness after 7 days>

An adhesive composition was melted at 100° C. to form an adhesives layer measuring 40 mm in length×25 mm in width×100 μm in thickness on a polycarbonate plate measuring 90 mm in length×75 mm in width×2 mm in thickness in the environment of a temperature of 23° C. and a humidity of 50%, and a polycarbonate film measuring 250 mm in length×25 mm in width×100 μm in thickness was then crimped on the adhesives layer to manufacture a specimen. The specimen was left to stand in the environment of a temperature of 23° C. and a humidity of 50% for 7 days, and a 90° peel test (peel speed: 200 mm/min) was then performed to measure adhesive strength (N/25 mm).

<Adhesiveness After High Temperature and Humidity Test>

An adhesive composition was melted at 100° C. to form an adhesives layer measuring 40 mm in length×25 mm in width×100 μm in thickness on a polycarbonate plate measuring 90 mm in length×75 mm in width×2 mm in thickness in the environment of a temperature of 23° C. and a humidity of 50%, and a polycarbonate film measuring 250 mm in length×25 mm in width×100 μm in thickness was then crimped on the adhesives layer to manufacture a specimen. The specimen was left to stand in the environment of a temperature of 23° C. and a humidity of 50% for 7 days and left to stand under the high temperature and high humidity conditions of a temperature of 85° C. and a humidity of 85% for 7 days. Subsequently, a 90° peel test (peel speed: 200 min/min) was then performed to measure adhesive strength (N/25 mm).

<Mechanical Characteristics>

A specimen obtained by melting an adhesive composition at 100° C. and forming it in a coat shape measuring 15 mm in length×40 mm in width×100 μm in thickness was produced and left to stand in a thermo-hygrostat at a temperature of 23° C. and a humidity of 50% for 7 days, and an elastic modulus in tension (MPa), breaking strength (MPa) and breaking extension (%) of the adhesives layer were then measured according to JIS K-7127 using an Autograph AGS-X (manufactured by SHIMADZU CORPORATION).

<Impact Resistance>

An adhesive composition was melted at 100° C., and placed in a syringe container (manufactured by Musashi Engineering, Inc., trade name "PSY-30E") equipped with a precise nozzle (manufactured by Musashi Engineering, Inc., trade name "SHN-0.25N") having an inner diameter of 0.25 mm, a square of 40 mm×40 mm was drawn on an adherend A (polycarbonate plate: 100 mm in width×50 mm in length×2 mm in thickness, a hole of 20 mm in inner diameter at the central portion) so as to surround the hole by ejecting the melted adhesive composition using a dispenser (manufactured by Musashi Engineering, Inc., trade name "SHOT-MASTER 200DS") beforehand heated at 100° C., and an adherend B (acrylic board: 50 mm in width×50 mm in length×4 mm in thickness) and it were pasted together, followed by the adjustment of the width and the thickness of the adhesive layer to 0.3 mm and 0.1 mm, respectively to manufacture a laminated body obtained by laminating the adherend A, the adhesives layer and the adherend B in this order. After it was left to stand in the environment of a temperature of 23° C. and a humidity of 50% for 3 days, the adherend A side of the laminated body was fixed to a du Pont impact machine (manufactured by TESTER SANGYO CO., LTD., trade name "du Pont impact tester") with the adherend B side of the laminated body downward in the environment of a temperature of 23° C. and a humidity of 50%. Subsequently, an impact core (6.25 mm in radius) was placed so as to be in contact with the surface on the side to which the adhesive was applied of the adherend B through the hole of the adherend A of the laminated body from above.

Then, force was applied to the adherend B of the laminated body downward in the vertical direction by dropping a weight having a load of 300 g from above from a height of 200 mm, 250 mm or 300 mm and collide it with the impact core, and it was visually confirmed whether the peeling of the adherend B from the laminated body occurred or not. An adhesive composition on which there was not the peeling of the adherend B was evaluated as "A", and an adhesive composition on which there was the peeling of the adherend B was evaluated as "B."

TABLE 1

|  | Example 1 | Example 2 | Example 3 | Example 4 | Example 5 | Example 6 |
|---|---|---|---|---|---|---|
| Polyester polyol a | 10 | 10 | 8 | 10 | 10 | 10 |
| Polyester polyol b | 45 | 40 | 33 | 40 | 40 | 40 |
| Polyester polyol c | 8 | 7 | 6 | 7 | 7 | 7 |
| Polyester polyol d | 3 | 3 | 2 | 3 | 3 | 3 |
| Polyether polyol | 24 | 20 | 16 | 20 | 20 | 20 |
| Polybutadiene polyol a | 10 | 0 | 35 | 20 | 20 | 20 |
| Polybutadiene polyol b | 0 | 20 | 0 | 0 | 0 | 0 |
| Isocyanate | 24 | 22 | 27 | 25 | 25 | 25 |
| Antioxidant | 0.2 | 0.2 | 0.2 | 0.1 | 3 | 5 |
| Viscosity (Pa · s/120° C.) | 3.4 | 3.8 | 4.5 | 3.7 | 4.3 | 5.5 |

TABLE 1-continued

|  |  | Example 1 | Example 2 | Example 3 | Example 4 | Example 5 | Example 6 |
|---|---|---|---|---|---|---|---|
| Adhesive strength (N/25 mm) | 7 days after | 128 | 450 | 144 | 440 | 410 | 400 |
|  | After high temperature and high humidity test | 116 | 350 | 120 | 345 | 360 | 375 |
| Elastic modulus in tension (MPa) |  | 27 | 33 | 35 | 31 | 35 | 36 |
| Breaking strength (MPa) |  | 13 | 15 | 18 | 16 | 18 | 17 |
| Breaking extension (%) |  | 988 | 1063 | 1150 | 1075 | 1011 | 1008 |
| Impact resistance | Height: 200 mm | A | A | A | A | A | A |
|  | Height: 250 mm | A | A | A | A | A | A |
|  | Height: 300 mm | A | A | A | A | A | A |

TABLE 2

|  | Comparative Example 1 | Comparative Example 2 | Comparative Example 3 | Comparative Example 4 |
|---|---|---|---|---|
| Polyester polyol a | 13 | 10 | 0 | 13 |
| Polyester polyol b | 50 | 40 | 0 | 50 |
| Polyester polyol c | 9 | 7 | 0 | 9 |
| Polyester polyol d | 3 | 3 | 0 | 3 |
| Polyether polyol | 25 | 20 | 70 | 0 |
| Polybutadiene polyol a | 0 | 20 | 30 | 0 |
| Polybutadiene polyol b | 0 | 0 | 0 | 25 |
| Isocyanate | 22 | 25 | 28 | 21 |
| Antioxidant | 0.2 | 0 | 0.2 | 0.2 |
| Viscosity (Pa · s/120° C.) | 3.0 | 3.3 | 2.4 | 3.8 |
| Adhesive strength (N/25 mm) 7 days after | 90 | 106 | 65 | 80 |
| After high temperature and high humidity test | 80 | 35 | 53 | 67 |
| Elastic modulus in tension (MPa) | 16 | 20 | 13 | 58 |
| Breaking strength (MPa) | 11 | 12 | 7 | 19 |
| Breaking extension (%) | 1175 | 1085 | 660 | 886 |
| Impact resistance Height: 200 mm | B | A | B | B |
| Height: 250 mm | B | B | B | B |
| Height: 300 mm | B | B | B | B |

The adhesive compositions of Examples 1 to 6, which contained a urethane prepolymer in which the polyester polyols, the polyether polyol and a polybutadiene polyol were blended, had high adhesiveness and high impact resistance. Meanwhile, the adhesive composition of Comparative Example 1, which contained a urethane prepolymer in which a polybutadiene polyol was not blended; the adhesive composition of Comparative Example 3, which contained a urethane prepolymer in which the polyester polyols were not blended; and the adhesive composition of Comparative Example 4, which contained a urethane prepolymer in which the polyether glycol was not blended, all had inferior adhesiveness and impact resistance.

The adhesive compositions of Examples 1 to 6, which contained the antioxidant, had high adhesiveness and high reliability even if they are kept under high temperature and high humidity conditions for 7 days. Meanwhile, the adhesive composition of Comparative Example 2, which did not contain an antioxidant, decreased markedly in adhesiveness and had low reliability when it was kept under high temperature and high humidity conditions for 7 days.

From the above, it is found that the moisture-curable reactive hot-melt adhesive compositions obtained in Examples 1 to 6 have low initial viscosity at 120° C. and excellent application workability, and have excellent adhesiveness and excellent impact resistance even though the adhesion width is narrow.

The invention claimed is:

1. A moisture-curable reactive hot-melt adhesive composition, comprising:
    a urethane prepolymer having an isocyanate group, the urethane prepolymer being a reaction product of a polyol component comprising a polyester polyol, a polyether polyol and a polybutadiene polyol with an isocyanate component, the polyester polyol comprising a crystalline polyester polyol, an amorphous polyester polyol having a number average molecular weight of 3000 or less and an amorphous polyester polyol having a number average molecular weight of 5000 or more; and
    an antioxidant.

2. The moisture-curable reactive hot-melt adhesive composition according to claim 1, wherein the polybutadiene polyol has 20% or more of a structural unit having a 1,2-vinyl bond and represented by the following formula (1)

[Chemical Formula 1]

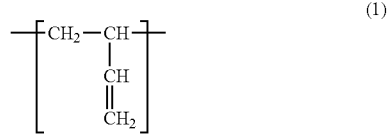

(1)

3. The moisture-curable reactive hot-melt adhesive composition according to claim 1, wherein a content of the polybutadiene polyol is 5 to 45 parts by mass based on a total amount of the polyol component of 100 parts by mass.

4. The moisture-curable reactive hot-melt adhesive composition according to claim 1, wherein a content of the antioxidant is 0.05 to 5 parts by mass per 100 parts by mass of the urethane prepolymer having an isocyanate group.

5. A method for producing a moisture-curable reactive hot-melt adhesive composition comprising a urethane prepolymer having an isocyanate group and an antioxidant, the method comprising:
 a step of reacting a polyol component comprising a polyester polyol, a polyether polyol and a polybutadiene polyol with an isocyanate component to obtain the urethane prepolymer having an isocyanate group, the polyester polyol comprising a crystalline polyester polyol, an amorphous polyester polyol having a number average molecular weight of 3000 or less and an amorphous polyester polyol having a number average molecular weight of 5000 or more.

6. The moisture-curable reactive hot-melt adhesive composition according to claim 2, wherein a content of the polybutadiene polyol is 5 to 45 parts by mass based on a total amount of the polyol component of 100 parts by mass.

7. The moisture-curable reactive hot-melt adhesive composition according to claim 2, wherein a content of the antioxidant is 0.05 to 5 parts by mass per 100 parts by mass of the urethane prepolymer having an isocyanate group.

8. The moisture-curable reactive hot-melt adhesive composition according to claim 3, wherein the content of the antioxidant is 0.05 to 5 parts by mass per 100 parts by mass of the urethane prepolymer having an isocyanate group.

9. The moisture-curable reactive hot-melt adhesive composition according to claim 6, wherein the content of the antioxidant is 0.05 to 5 parts by mass per 100 parts by mass of the urethane prepolymer having an isocyanate group.

10. The moisture-curable reactive hot-melt adhesive composition according to claim 1, wherein the amorphous polyester polyol having a number average molecular weight of 5000 or more has a number average molecular weight in the range of 7000 to 8000.

11. The moisture-curable reactive hot-melt adhesive composition according to claim 1, wherein a content of the polyester polyol is 40 to 70 parts by mass based on a total amount of the polyol component of 100 parts by mass.

12. The moisture-curable reactive hot-melt adhesive composition according to claim 1, wherein a content of the polyether polyol is 10 to 30 parts by mass based on a total amount of the polyol component of 100 parts by mass.

13. The moisture-curable reactive hot-melt adhesive composition according to claim 1, wherein the polybutadiene polyol has a number average molecular weight in the range of 1000 to 2800.

14. The moisture-curable reactive hot-melt adhesive composition according to claim 1, wherein the amorphous polyester polyol having a number average molecular weight of 3000 or less has a number average molecular weight in the range of 500 to 3000, and the amorphous polyester polyol having a number average molecular weight of 5000 or more has a number average molecular weight in the range of 5000 to 9000.

15. The method according to claim 5, wherein the amorphous polyester polyol having a number average molecular weight of 5000 or more has a number average molecular weight in the range of 7000 to 8000.

16. The method according to claim 5, wherein a content of the polyester polyol is 40 to 70 parts by mass based on a total amount of the polyol component of 100 parts by mass.

17. The method according to claim 5, wherein a content of the polyether polyol is 10 to 30 parts by mass based on a total amount of the polyol component of 100 parts by mass.

18. The method according to claim 5, wherein the polybutadiene polyol has a number average molecular weight in the range of 1000 to 2800.

19. The method according to claim 5, wherein the amorphous polyester polyol having a number average molecular weight of 3000 or less has a number average molecular weight in the range of 500 to 3000, and the amorphous polyester polyol having a number average molecular weight of 5000 or more has a number average molecular weight in the range of 5000 to 9000.

* * * * *